(12) United States Patent
Kurz et al.

(10) Patent No.: US 8,267,385 B2
(45) Date of Patent: Sep. 18, 2012

(54) HOLDING DEVICE FOR FIXING A SUBSTRATE

(75) Inventors: Martin Kurz, Kronberg (DE); Thorsten Grahl, Moembris (DE); Martin Angermann, Kronberg (DE); Brian MacKintosh, Concord, MA (US)

(73) Assignee: Schott AG, Mainz (DE)

( * ) Notice: Subject to any disclaimer, the term of this patent is extended or adjusted under 35 U.S.C. 154(b) by 792 days.

(21) Appl. No.: 12/306,034

(22) PCT Filed: Jul. 5, 2007

(86) PCT No.: PCT/EP2007/056838
§ 371 (c)(1),
(2), (4) Date: Dec. 22, 2008

(87) PCT Pub. No.: WO2008/006770
PCT Pub. Date: Jan. 17, 2008

(65) Prior Publication Data
US 2009/0230603 A1    Sep. 17, 2009

(30) Foreign Application Priority Data
Jul. 12, 2006 (DE) .................. 10 2006 032 185

(51) Int. Cl.
*B25B 11/00* (2006.01)
(52) U.S. Cl. .......................... 269/21; 269/20
(58) Field of Classification Search ............... 269/9, 20, 269/21, 289 R, 302.1; *B25B 11/00*
See application file for complete search history.

(56) References Cited

U.S. PATENT DOCUMENTS

| 2,907,304 | A | | 10/1959 | Macks |
| 3,567,043 | A | * | 3/1971 | Sirvet et al. .................. 414/736 |
| 5,059,088 | A | | 10/1991 | Klein |
| 5,372,357 | A | * | 12/1994 | Blaimschein .................. 269/21 |
| 2004/0195850 | A1 | | 10/2004 | Ogimoto |
| 2006/0267262 | A1 | * | 11/2006 | Schiavi et al. .................. 269/21 |

FOREIGN PATENT DOCUMENTS

| DE | 1 058 432 | 5/1959 |
| DE | 43 27 438 | 2/1995 |
| DE | 10 2004 025 781 | 7/2005 |
| FR | 2 714 038 | 6/1995 |
| GB | 2 036 842 | 7/1980 |
| JP | 10180671 | 7/1998 |
| WO | 2005/087631 | 9/2005 |

* cited by examiner

*Primary Examiner* — Lee D Wilson
(74) *Attorney, Agent, or Firm* — Michael J. Striker

(57) ABSTRACT

The invention relates to a holding device (1), especially for fixing a glass substrate during a cutting process. The holding device comprises a housing (2) and a plunger (3) which can be axially displaced in relation to the housing (2). The plunger has a first and a second end section (4, 5), the first end section (4) projecting from the housing (2) and having a suction element (6). The aim of the invention is inter alia to improve a known holding device in such a manner that the substrate can be approached and fixed almost without the application of force. The holding device (1) according to the invention is characterized in that the plunger (3) is received in the housing (2) by a pneumatic spring. A holding system (20) comprising a plurality of holding devices (1) is protected in a support plate (24), the support plate (24) having a vacuum channel collector (21) which is connected to vacuum channels (13) and which is connected to a common vacuum pump (14).

14 Claims, 2 Drawing Sheets

A : A

HOLDING DEVICE FOR FIXING A SUBSTRATE

CROSS-REFERENCE

This is the U.S. National Stage of PCT/EP2007/056838, filed on Jul. 5, 2007 in Europe. The invention described herein below is also described in German Application 10 2006 032 185.5, filed in Germany on Jul. 12, 2006, which provides the basis for a priority claim under 35 U.S.C. 365 and 35 U.S.C. 119 (a)-(d).

The present invention relates to a holding device, in particular for fixing a substrate during processing. The holding device includes a housing and a plunger which is supported in a manner such that it is displaceable in its axial direction relative to the housing, the plunger including a first and second end section, the first end section extending out of the housing and including a fixing element. In addition, a holding system is protected in a common carrier plate using several holding devices.

Holding devices of this type are used, in particular, with fragile substrates, e.g., glass substrates, which have minimal thickness. A typical application is the manufacture of wafers, in the case of which a tubular or plate-type, thin glass body is separated in the radial direction using a cutting device. After the separation procedure, it is important for the separated segments to be held and then transported further without becoming damaged.

The prior art describes holding devices which include several plungers located thereon, on the ends of each of which a suction element is installed. In a starting position, the plungers are pressed into a front end position via a compression spring. As the plungers approach the substrate, the flatness of which is not ideal, each plunger is depressed individually. Due to the increasing spring force produced when the plunger is depressed, the pressure acting on the substrate is not constant, but rather increases according to the spring characteristic. Even when extremely weak springs are used, the forces that occur may cause the substrate to break. The existing systems must also be optimized to attain the goal of processing thinner substrates.

The object of the present invention, therefore, was to develop a holding device to allow the substrate to be approached in a nearly force-free manner and to fixe it in a force-free manner.

A further part of the object was to position several of the holding devices according to the present invention on a common carrier plate in a particularly favorable manner.

The object is attained according to the present invention using a holding device in the case of which the plunger is supported in the housing in a gas-buffered manner. The plunger is a freely-moving plunger in a cylinder formed by the housing. An exact plunger force that is independent of the stroke may be set by selecting a defined pressure in the housing. This is made possible using structural means by the fact that the second end section of the plunger inside the housing is always located in a single pressure chamber. The plunger is thereby positioned at a distance from the wall of the pressure chamber, so that the pressure which is present in the pressure chamber acts on all sides of the plunger. The gas buffering may be realized, e.g., using a pressure chamber which may be acted upon in the housing a pressure medium which acts on the second end section of the plunger.

In a preferred embodiment, the pressure chamber is connected to a pressure line, and a proportional valve is located in the pressure line. Proportional pressure valves of this type are continually-operating valves, the pneumatic output variable of which is proportional to an electric input signal, and which are typically actuated by a proportional magnet. Using proportional valves, it is possible to set the switching paths such that they have a constant transition. The particular response pressure may be specified using an electric signal.

The pressure is set in the pressure chamber with the aid of the proportional valve, thereby resulting in a constant force being applied across the entire plunger stroke when the plunger extends and retracts. The proportional valve also makes it possible to set various pressures or pressure stages, thereby making it possible to provide different plunger forces for different process steps.

The fixing element is advantageously designed as a suction element. The suction element operates using a vacuum, thereby holding the glass substrate firmly via a non-positive connection.

In a design that has proven particularly favorable, the plunger includes an axial borehole which leads into the fixing element or the suction element, the axial borehole including at least one radial borehole. In addition, an expanded annular space is formed in the housing opposite to the at least one radial borehole, the annular space being connected to a vacuum channel. The vacuum required to draw the substrate to the suction element and hold it there is transferred from the stationary housing via the boreholes to the movable piston. In this embodiment, it is therefore possible to eliminate a vacuum tube. The vacuum tube is bent for structural reasons and has spring-like properties which, similar to a compression spring, impart a preferred direction to the plunger. According to the proposed embodiment, the plunger may adapt to the actual shape of the substrate to be suctioned up, uninfluenced by externally-induced forces of the device such as a compression spring or a vacuum tube, thereby providing an even more optimal means of attaining the object of the present invention.

After the substrate is fixed on the fixing element, it is held in position in a manner such that it is nearly strain-free for the particular product, in particular in conjunction with the selection of various pressure levels using the proportional valve. For particular applications, the pressure level may be reduced to a pressureless state.

The vacuum channel is advantageously connected to a vacuum pump.

The plunger may be supported relative to the housing a magnetic bearing. A particularly low-friction means of support is attained as a result.

As an alternative, it is also possible to support the plunger relative to the housing using an air bearing. An air bearing is understood to be a porous material, e.g., composed of graphite, which encloses the plunger in the axial direction and acts on it using compressed air. The air bearing ensures that the plunger will move in a nearly frictionless manner, and it increases the stiffness of the plunger against transversal forces that result.

Favorably, the air bearing is acted upon using a separate compressed air supply. To ensure that the bearing functions without interference for long periods of time, the compressed air supply of the air bearing should be composed of prepared air, i.e., air that has been cleaned and dried.

The air bearing preferably abuts the pressure chamber via one side. This results in the advantage that a small portion of the compressed air flow may flow out of the air bearing and into the pressure chamber. When particularly sensitive substrates are used, the vacuum which is present in the pressure chamber as a result may be sufficient to hold the plunger in the extended starting position using an extremely small amount of force without introducing a further flow of compressed air into the pressure chamber.

It has also proven advantageous when the axial length of the air bearing is greater than the displacement of the plunger. This increases the property, in particular, of also being able to absorb transversal forces.

In a preferred embodiment, the position of the plunger is detected using a plunger position detection device. The plunger position detection device may include, e.g., a sensor located in the pressure chamber, which detects the second end section of the plunger. With the aid of the plunger position query, it is determined whether successful contact has been made between the plunger and the substrate. In addition, the cut through the substrate is inspected, because the plungers reach their detected end position when they are extended into the starting position only if the substrate has been separated completely and error-free.

Favorably, an operating cylinder which acts on the plunger when in an extended position is located in the housing, transversely to the axial orientation of the plunger. In the extended position, the operating cylinder functions as a plunger brake and fixes the plunger in the axial direction of motion. For this purpose, additional form-fit elements may be formed on the operating cylinder and/or plunger.

The sub-problem is solved via a holding system having several of the holding devices according to the present invention in a common carrier plate, the plungers being supported in the housing in a gas-buffered manner.

The carrier plate may include a vacuum collecting channel which is connected to vacuum channels, and which is connected to a common vacuum pump. This results is a particularly compact, modular system design. The vacuum channels and/or the vacuum collecting channel pass through the carrier plate or the housing, preferably as boreholes.

To enhance understanding, the present invention is explained below in greater detail below with reference to four figures, FIG. 1 shows a side view of a holding system having a carrier plate and six visible holding devices;

Figure 1:
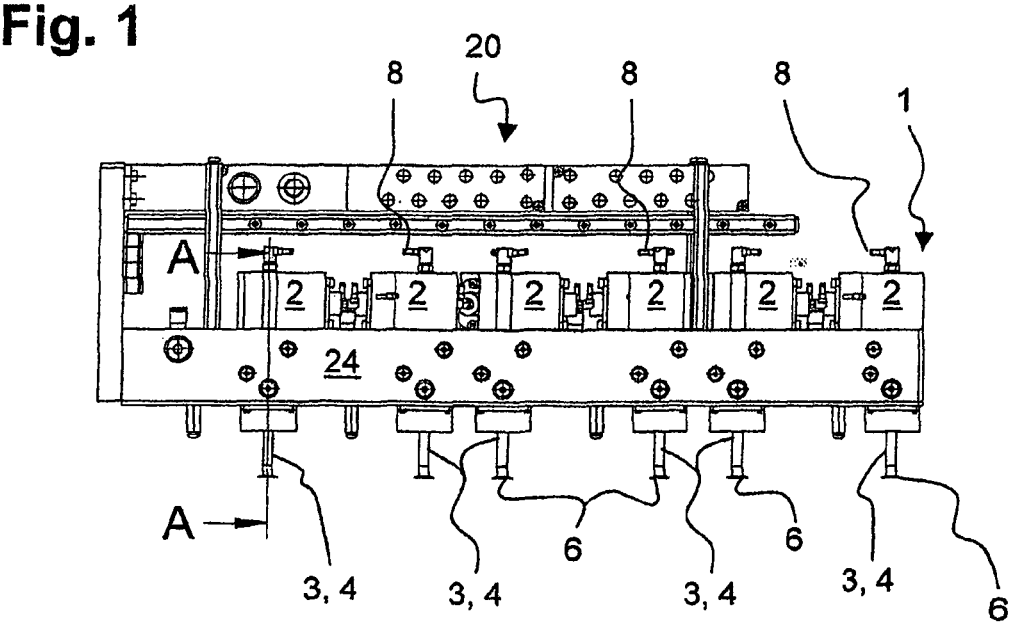

FIG. 1 shows a side view of a holding system 20 having a carrier plate 24, in which twelve holding devices 1 are inserted. Due to the symmetrical placement of holding devices 1, only six holding devices 1 are visible in FIG. 1.

Holding devices 1 of holding system 20 each include a housing 2, which extends above and below carrier plate 24, and a plunger 3 which extends out of housing 2. A suction element 6 for making contact with a substrate (not depicted) is fixed in position on first end section 4 of plunger 3. In the extended position of plunger 3 shown, all suction elements 6 of holding system 20 are located in a plane. As the substrate is approached, plungers 3 adapt to the shape of the surface of the substrate by sliding into particular housing 2.

Pressure lines 8 extend above the top side on each housing 2. Pressure lines 8 may be connected to a compressed air supply device which is not depicted.

Figure 2:
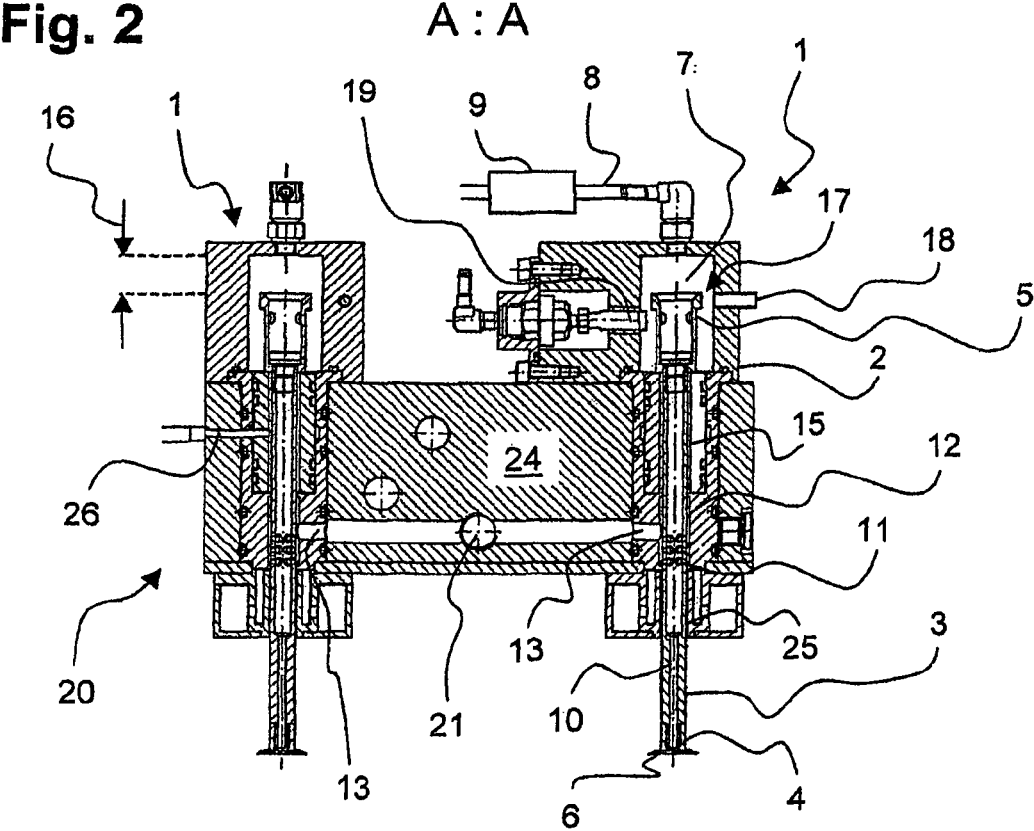
FIG. 2 shows a cross section along line A:A in FIG. 1.

FIG. 2 shows a cross section along cutting plane A:A in FIG. 1, in which the adjacent positioning of two identically designed holding devices 1 is shown particularly clearly. Every holding device 1 includes a single pressure chamber 7 which may be acted upon using compressed air via pressure line 8 and a proportional valve 9 located therein. A pressure chamber 7 is understood to mean a delineated installation space in which a uniform pressure level is present. Starting at pressure chamber 7, a cylindrical borehole 25 which accommodates plunger 3 in an axially displaceable manner passes through housing 2.

Plunger 3 is guided by the cylindrical borehole 25 along a large portion of its axial length. Only first end section 4 is located outside of borehole 25 and outside of housing 2, and it includes a suction element 6 on its end. First end section 4 may include an undercut for establishing a form-fit connection to suction element 6. A second end section 5 is still located in pressure chamber 7 when plunger 3 is fully extended. The open installation space remaining in pressure chamber 7 above second end section 5 represents maximum displacement 16 of plunger 3. The second end section 5 is spaced in a radial direction from the interior wall of the pressure chamber 7.

Before a substrate (not depicted) approaches particular holding devices 1, pressure chambers 7 are acted upon using an adjustable pressure level which may be the ambient pressure when working with particularly sensitive substrates. Plungers 3 are contacted and slid inward in accordance with the shape of the surface. Plungers 3 apply extremely minimal friction resistance to the substrate, due to an air bearing 15 which is installed in the cylindrical borehole. Air bearing 15 is supplied with purified compressed air via a separate air bearing supply channel 26. Due to the fine-pored structure of air bearing 15, however, a portion of the compressed air from air bearing 15 may enter pressure chamber 7, where it could raise the pressure slightly even though pressure line 8 is closed. This effect is utilized for sensitive substrates in particular.

While suction element 6 is in contact with the substrate, vacuum is applied to a vacuum collecting channel 21 installed in carrier plate 24 by a vacuum pump 14 (see FIG. 3) located outside of holding system 20. Vacuum collecting channel 21 is connected to vacuum channels 13 of housing 2, which extend into cylindrical borehole 25. In this section, cylindrical borehole 25 includes an expanded annular space 12. The axial extension of expanded annular space 12 is designed in a manner such that, independently of the position of the plunger, one of the several radial boreholes 11 formed in plunger 3 is always covered by expanded annular space 12, thereby exposing a flow path. Plunger 3 is tubular in design, includes an axial borehole 10, and is closed on second end section 5. As a result, the vacuum continues to suction element 6 located on first end section 4.

The position of plunger 3 relative to housing 2 is detected by a plunger position detection device 17 which essentially includes a sensor 18 located on pressure chamber 7. Sensor 18 inductively outputs an output signal when second end section 5 approaches. For this purpose, second end section 5 is provided with a plate-type expansion of its diameter.

It is also possible to block the displacement of plunger 3. This takes place using a pneumatically controllable operating cylinder 9 which, in its extended position, makes contact with second end section 5 of plunger 3, thereby preventing plunger 3 from becoming displaced in its axial direction.

Figure 3:
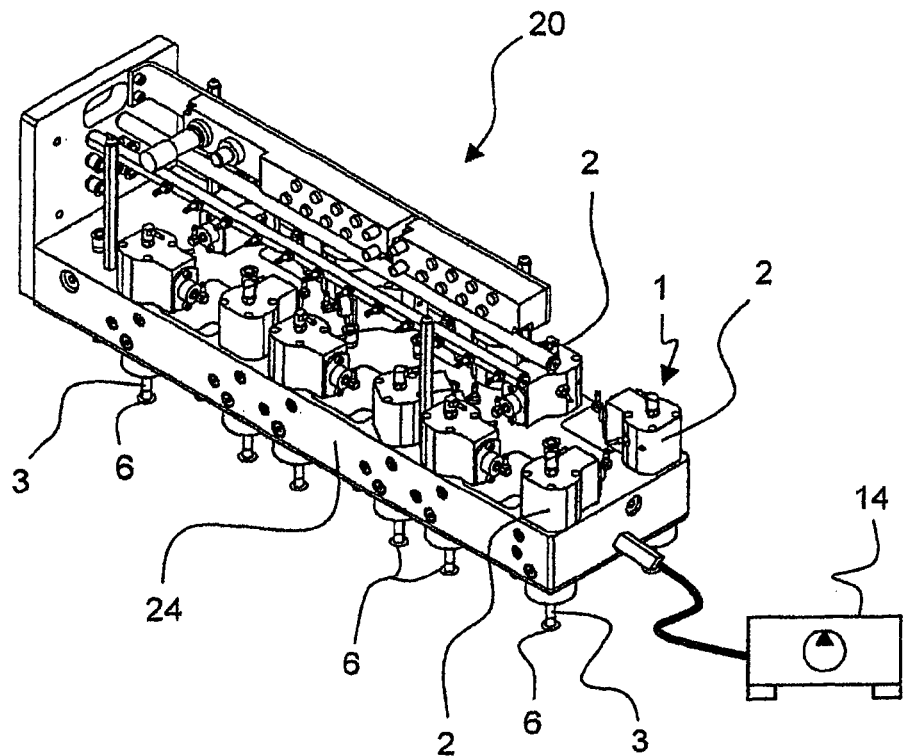
FIG. 3 shows a perspective view according to FIG. 1.
Figure 4:
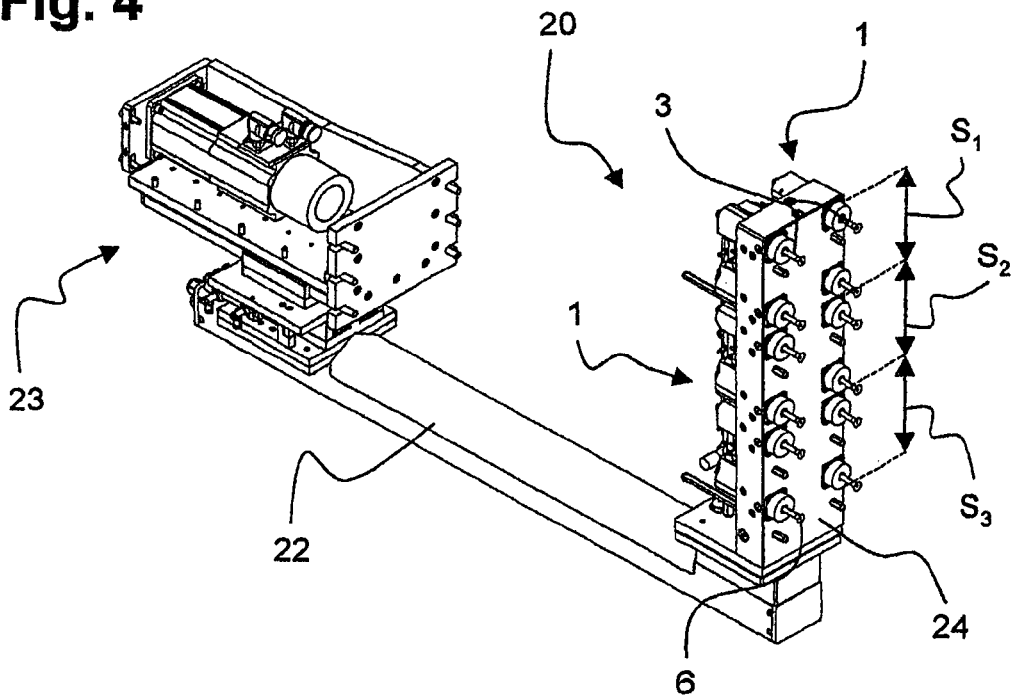
FIG. 4 shows a perspective view of a system having a carrier plate and twelve holding devices in the installation position.

FIGS. 3 and 4 shows perspective views of holding system 20 according to the present invention. As shown in FIG. 4, holding system 20—in the installation position—stands largely vertically on an extension arm 22, on the opposite end of which a drive unit 23 is mounted. The substrate, e.g., glass tubes, are placed on holding system 20—to be blanked—from the top in a manner such that holding devices 1 are located inside the substrate or glass tube. Plungers 3 then come in contact with the wall from the inside via suction elements 6. In the contacted state, the cutting procedure is typically carried out with the aid of a laser. A cut separation $S_1$, $S_2$, $S_3$ is indicated in FIG. 4 as a dashed line. Due to this specified cut separation $S_1$, $S_2$, $S_3$, four holding devices 1 carry one separated segment of the substrate after the cutting procedure until it is handed off to a further conveying means.

LIST OF REFERENCE NUMERALS

1 Holding device
2 Housing
3 Plunger
4 First plunger end section
5 Second plunger end section
6 Fixing element, suction element
7 Pressure chamber
8 Pressure line
9 Proportional valve
10 Plunger axial bore
11 Radial borehole(s)
12 Expanded annular space
13 Vacuum channel
14 Vacuum pump
15 Air bearing
16 Plunger displacement
17 Plunger position detection device
18 Sensor
19 Operating cylinder
20 Holding system
21 Vacuum collector channel
22 Extension arm
23 Drive unit
24 Carrier plate
25 Cylindrical borehole
26 Air bearing supply channel
$S_1 \ldots S_3$ Cut separation

What is claimed is:

1. A holding device (1), in particular for fixing a glass substrate during a cutting process, said holding device (1) comprising
a housing (2);
a plunger (3) supported in the housing (2) in a gas-buffered manner so as to be displaceable in an axial direction thereof relative to the housing (2), said plunger (3) including a first end section (4) and a second end section (5); and
a pressure chamber (7) having interior surfaces, said plunger (3) being located with said second end section (5) at a distance from a wall of the pressure chamber (7) so that all of said interior surfaces of said pressure chamber are not contact with said second end section and a pressure existing in the pressure chamber (7) acts on all sides of said second end section (5) the plunger (3);
wherein the first end section (4) of the plunger (3) extends out of the housing (2) and includes a suction element (6).

2. The device as defined in claim 1, wherein the pressure chamber (7) is arranged in the housing (2) and is formed so that a pressure medium may act on the pressure chamber (7) and the second end section (5) of the plunger (3) is acted on by the pressure medium when the pressure medium acts on the pressure chamber (7).

3. The device as defined in claim 2, wherein the pressure chamber (7) is connected to a pressure line (8) and a proportional valve (9) is located in the pressure line (8).

4. The device as defined in claim 1, wherein the plunger (3) is provided with an axial borehole (10) that leads into the suction element (6) and at least one radial borehole (11) connected with the axial borehole (10); wherein the housing (2) is provided with an expanded annular space (12) around the plunger (3) and opposite from the at least one radial borehole (11); and wherein the annular space (12) is connected to a vacuum channel (13).

5. The device as defined in claim 4, wherein the vacuum channel (13) is connected to a vacuum pump (14).

6. The device as defined in claim 1, further comprising an air bearing (15) supporting the plunger (3) relative to the housing (2).

7. The device as defined in claim 6, wherein the air bearing (15) is acted upon via a compressed air supply.

8. The device as defined in claim 6, wherein one end of the air bearing (15) abuts the pressure chamber (7).

9. The device as defined in claim 6, wherein the air bearing (15) has an axial length that is greater than a displacement (16) of the plunger (3).

10. The device as defined in claim 1, wherein a position of the plunger (3) is detected via a plunger position detection device (17).

11. The device as defined in claim 10, wherein the plunger position detection device (17) includes a sensor (18) located in the pressure chamber (7), and which detects the second end section (5) of the plunger (3).

12. The device as defined in claim 1, further comprising an operating cylinder (19) arranged in the housing (2) transversely to the axial direction in which the plunger (3) is displaceable and acts on the plunger (3) in an extended position thereof.

13. A holding system (20) for holding a substrate fixed during processing, said holding system comprising
a common carrier plate (24); and
a plurality of holding devices (1) arranged in the common carrier plate (24);
wherein each of the holding devices (1) includes a housing (2) and a plunger (3) supported in the housing (2) so that the plunger (3) is displaceable in an axial direction thereof relative to the housing (2), the plunger (3) including a first end section (4) and a second end section (5);
wherein the first end section (4) extends out of the housing (2) and includes a suction element (6) and the plunger (3) is supported in the housing (2) in a gas-buffered manner, and the second end section (5) extends into a pressure chamber (7) provided in the housing (2) so that the plunger is spaced at a distance from a cylindrical interior wall of the pressure chamber (7) and a pressure present in the pressure chamber (7) acts on all sides of the plunger (3); and
wherein the carrier plate (24) is provided with a common vacuum channel (21) connected to individual vacuum channels (13) and the common vacuum channel (21) is connected to a common vacuum pump (14).

14. A holding device (1), in particular for fixing a glass substrate during a cutting process, said holding device (1) comprising
a housing (2);
a plunger (3) supported in the housing (2) in a gas-buffered manner so as to be displaceable in an axial direction thereof relative to the housing (2), said plunger (3) including a first end section (4) and a second end section (5); and
a pressure chamber (7), said plunger (3) being located with said second end section (5) spaced at a radial distance from an interior wall of the pressure chamber (7) so that a pressure existing in the pressure chamber (7) acts on all sides of said second end section (5) of the plunger (3);
wherein the first end section (4) of the plunger (3) extends out of the housing (2) and includes a suction element (6).

* * * * *